(12) United States Patent
Shore

(10) Patent No.: US 7,118,717 B2
(45) Date of Patent: Oct. 10, 2006

(54) SIMPLIFIED ARTICLE FOR CARBON MONOXIDE REMOVAL

(75) Inventor: Lawrence Shore, Edison, NJ (US)

(73) Assignee: Engelhard Corporation, Iselin, NJ (US)

( * ) Notice: Subject to any disclaimer, the term of this patent is extended or adjusted under 35 U.S.C. 154(b) by 150 days.

(21) Appl. No.: 10/236,085

(22) Filed: Sep. 6, 2002

(65) Prior Publication Data

US 2004/0048114 A1    Mar. 11, 2004

(51) Int. Cl.
*B01J 8/02*    (2006.01)
*C01B 3/02*    (2006.01)

(52) U.S. Cl. ............... 422/190; 422/189; 422/211; 422/222; 423/648.1; 423/247

(58) Field of Classification Search ........ 422/187–191, 422/193, 211, 222; 429/12, 19; 423/246, 423/247, 650, 651, 655; 252/373
See application file for complete search history.

(56) References Cited

U.S. PATENT DOCUMENTS

| | | | |
|---|---|---|---|
| 3,111,396 A | 11/1963 | Ball | 264/628 |
| 3,615,164 A * | 10/1971 | Baker et al. | 252/182.1 |
| 3,631,073 A * | 12/1971 | Cohn et al. | 252/376 |
| 3,910,770 A * | 10/1975 | Kobylinksi et al. | 422/172 |
| 5,258,349 A * | 11/1993 | Dalla Betta et al. | 502/330 |
| 5,674,460 A | 10/1997 | Plog et al. | 422/177 |
| 5,866,210 A * | 2/1999 | Rosynsky et al. | 427/294 |
| 5,879,640 A * | 3/1999 | Atmur et al. | 422/180 |
| 6,077,600 A | 6/2000 | Atmur et al. | 428/293.4 |

FOREIGN PATENT DOCUMENTS

| | | |
|---|---|---|
| EP | 650 922 A1 | 5/1995 |
| EP | 833401 A2 * | 4/1998 |
| EP | 1036757 A1 * | 9/2000 |
| EP | 1 059 263 A1 | 12/2000 |
| EP | 1 059 265 A2 | 12/2000 |
| EP | 1 174 486 A1 | 1/2002 |
| JP | 2001205051 A * | 7/2001 |
| WO | WO 97/43207 | 11/1997 |
| WO | WO 98/13294 | 4/1998 |
| WO | WO 99/15460 | 4/1999 |
| WO | WO 01/17681 A2 | 3/2001 |
| WO | WO 02/18269 A2 | 3/2002 |

* cited by examiner

*Primary Examiner*—Alexa Doroshenk Neckel
*Assistant Examiner*—Jennifer A. Leung
(74) *Attorney, Agent, or Firm*—Raymond F. Keller

(57) ABSTRACT

Provided are improved carbon monoxide removal articles and processes for treating hydrogen gas streams to achieve very low threshold levels of carbon monoxide. The articles have a substrate with an inlet end, an outlet end, a length extending between the inlet end to the outlet end, wall elements and a plurality of cells defined by the wall elements. A first layer is deposited on the wall elements from the inlet end and extending at least partially toward the outlet end. The first layer has a preferential carbon monoxide oxidation catalyst. A second layer contains a methanation catalyst, and is deposited on at least part of the first layer from the outlet end. The second layer has a length that is about 10–70% of the substrate length.

12 Claims, 9 Drawing Sheets

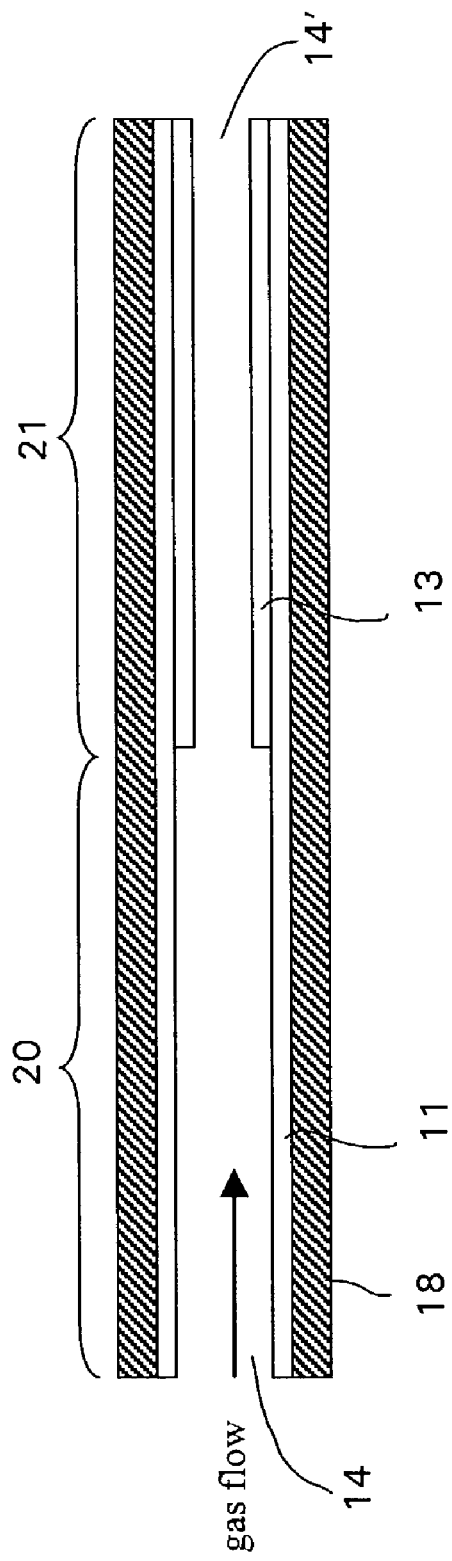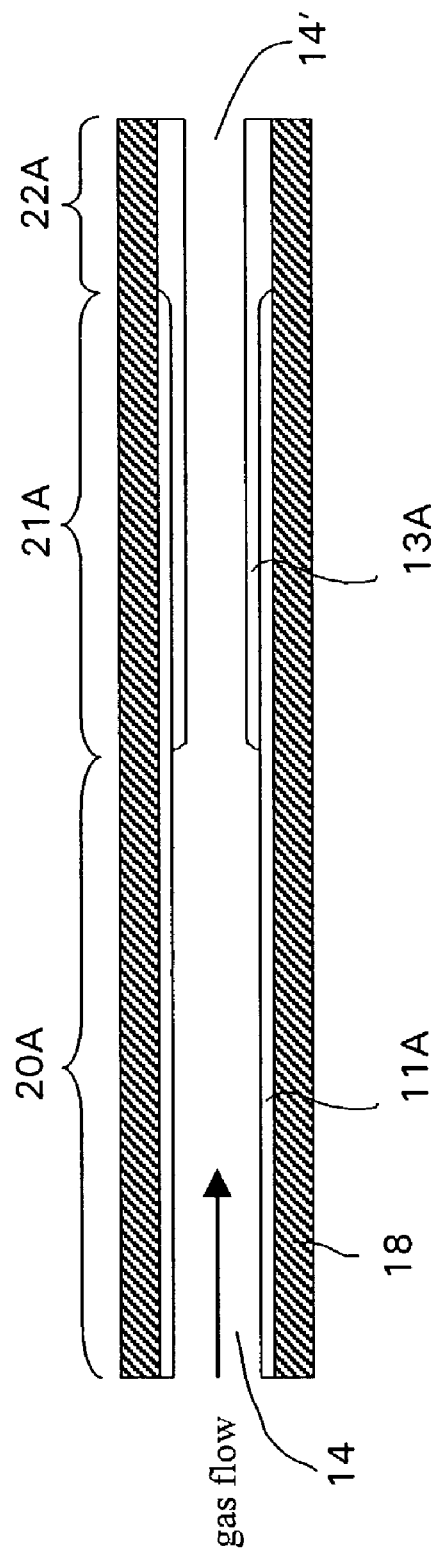

SIMPLIFIED ARTICLE FOR CARBON MONOXIDE REMOVAL

The present invention relates to articles and methods for the removal of carbon monoxide (CO) from a hydrogen gas stream. The invention also relates to apparatus (fuel processors) that incorporate the carbon monoxide removal articles that supply hydrogen to a fuel cell, particularly to a proton exchange membrane (PEM) fuel cell.

Fuel cells directly convert chemical energy into electricity thereby eliminating the mechanical process steps that limit thermodynamic efficiency, and have been proposed as a power source for many applications. The fuel cell can be two to three times as efficient as the internal combustion engine with little, if any, emission of primary pollutants such as carbon monoxide, hydrocarbons and nitric oxides. Fuel cell-powered vehicles which reform hydrocarbons to power the fuel cell generate less carbon dioxide (green house gas) and have enhanced fuel efficiency.

Fuel cell processors (also known as fuel cell reformers) supply a hydrogen-containing gas stream to the fuel cell. Fuel cell processors include reactors that steam reform hydrocarbon feedstocks (e.g., natural gas, LPG) and hydrocarbon derivatives (e.g., alcohols) to produce a process stream enriched in hydrogen. Other by-products from the steam reforming of hydrocarbon include carbon monoxide and carbon dioxide. For example, methane is converted to hydrogen, carbon monoxide and carbon dioxide by the two reactions below:

$$CH_4 + H_2O \rightarrow 3H_2 + CO$$

$$CH_4 + 2H_2O \rightarrow 4H_2 + CO_2$$

The resulting gas is then reacted in the water-gas shift reactor where the process stream is further enriched in hydrogen by reaction of carbon monoxide in the water-gas shift reaction:

$$CO + H_2O \rightleftharpoons CO_2 + H_2$$

Fuel cells, including PEM fuel cells [also called solid polymer electrolyte or (SPE) fuel cells], generate electrical power in a chemical reaction between a reducing agent (hydrogen) and an oxidizing agent (oxygen) which are fed to the fuel cells. A PEM fuel cell includes an anode and a cathode separated by a membrane which is usually an ion exchange resin membrane. The anode and cathode electrodes are typically constructed from finely divided carbon particles, catalytic particles supported on the carbon particles and proton conductive resin intermingled with the catalytic and carbon particles. In typical PEM fuel cell operation, hydrogen gas is electrolytically oxidized to hydrogen ions at the anode composed of platinum reaction catalysts deposited on a conductive carbon electrode. The protons pass through the ion exchange resin membrane, which can be a fluoropolymer of sulfonic acid called a proton exchange membrane. Water is produced when protons then combine with oxygen that has been electrolytically reduced at the cathode. The electrons flow through an external circuit in this process to do work, creating an electrical potential across the electrodes. Examples of membrane electrode assemblies and fuel cells are described in U.S. Pat. No. 5,272,017.

The platinum electrodes at the anode of the PEM fuel cells are extremely sensitive to carbon monoxide, even when present at levels below 100 ppm in the hydrogen feed stream supplied to the fuel cell. It is therefore desirable to reduce the levels of carbon monoxide in the hydrogen feed stream supplied to the fuel cell to as low a level as practical. Preferably, the level of carbon monoxide in the hydrogen feed stream ultimately supplied to the fuel cell is below 100 ppm, more preferably the level is below 10 ppm.

The bulk of the carbon monoxide in the fuel processor is converted to hydrogen and water in the water-gas shift reactor. More complete removal of carbon dioxide from the process stream using solely the water-gas shift reaction however, is difficult to achieve due to both kinetic and equilibrium limitations. Additional carbon monoxide purifying measures are used to achieve levels of carbon monoxide below 100 ppm in the process gas in the fuel processor.

Some of the processes used to achieve acceptable levels of carbon monoxide in the hydrogen stream include oxidation processes and methanation processes. For example, one well-known oxidation method utilized to lower the levels of carbon monoxide in hydrogen feed streams includes treatment of the stream with "preferential oxidation catalysts" (also known as "Prox" catalysts). These catalysts selectively oxidize residual carbon monoxide with oxygen in hydrogen gas streams according to the following reaction:

$$CO + \tfrac{1}{2}O_2 \rightarrow CO_2$$

wherein hydrogen may comprise greater than 60% by volume of the gas stream composition. An undesirable side reaction in this method is therefore the oxidation of hydrogen according to the following reaction:

$$H_2 + \tfrac{1}{2}O_2 \rightarrow H_2O.$$

In order to consume as little hydrogen as possible, the oxidation process is preferably as selective as possible for the oxidation of carbon monoxide. Some of the factors that influence the selectivity of the oxidation process include the composition of the input gas stream used in the process, the reaction temperature, the space velocity of the input gas stream and the composition of the preferential oxidation catalyst.

Certain of the effective preferential oxidation catalysts used in purifying hydrogen feed streams in fuel reformers are platinum-based catalysts, e.g., platinum on an alumina support. Platinum-based catalysts, such as those disclosed in U.S. patent application Ser. No. 09/392,813, filed Sep. 9, 1999, are able to treat hydrogen gas streams that contain significant concentrations of carbon monoxide, e.g., 0.75% by volume, with good selectivity to achieve levels of carbon monoxide below 50 ppm. Nevertheless, it may be difficult to achieve threshold levels of carbon monoxide below 100 ppm using only a single stage platinum-based catalyst due to the reverse water-gas shift activity exhibited by platinum-based catalysts. At the low space velocities of the input gas stream necessary to reach the equilibrium carbon monoxide concentration, the long residence time and the high concentration of hydrogen and carbon dioxide begin to favor the reverse water-gas shift reaction. These conditions contribute to the detrimental formation of carbon monoxide, and thwart efforts to more completely remove carbon monoxide from the hydrogen gas stream.

Lowering levels of carbon monoxide below 10 ppm from input gas streams that contain higher levels of carbon monoxide (e.g., 0.2 to 2% by volume) by preferential oxidation processes typically requires at least two catalyst stages. These higher levels of carbon monoxide are frequently observed in reformate gases received from water-gas shift reactors. In practice the treatment of such levels of carbon monoxide in hydrogen streams is conducted by treatment with a first preferential oxidation stage having a first oxygen input to produce an intermediate gas stream, which is then treated in a second preferential oxidation stage with a second injection of oxygen. The use of two preferential oxidation stages increases the volume and weight of the fuel processor. Moreover, the use of two oxygen injections is unfavorable from the standpoint that more hydrogen is inevitably oxidized in addition to the intended oxidation of carbon monoxide.

Another process for the purification of the hydrogen stream involves treatment of the stream with a methanation catalyst. This process involves the reaction of carbon monoxide and hydrogen in the presence of a methanation catalyst as shown below.

$$CO + 3H_2 \rightarrow CH_4 + H_2O$$

The levels of the carbon monoxide in the hydrogen stream to be treated should be sufficiently low because this reaction sacrifices three moles of hydrogen for each mole of carbon monoxide converted to methane. Minimal methane production is also desirable from an environmental standpoint.

Another factor in using the methanation process is that the catalyst and reaction conditions must be sufficiently optimized to provide selective methanation of carbon monoxide in the presence of substantially larger proportions of carbon dioxide. Methanation can occur with carbon dioxide according to the equation shown below:

$$CO_2 + 4H_2 \rightarrow CH_4 + 2H_2O.$$

In this side reaction four moles of hydrogen are consumed for each mole of carbon dioxide converted to methane. In addition, methanation of carbon dioxide can lead to a runaway reaction resulting in high temperatures that can damage the catalyst beds.

Other processes for removal of carbon monoxide employ a combination of the preferential oxidation and methanation reactions of carbon monoxide. For example, references such as EP 650922, WO 99/15460, WO 98/13294 and WO 97/43207 disclose treatment of a hydrogen streams using combinations of the preferential oxidation and methanation processes.

Continuing improvements in the design of fuel processors, and in particular, to the design of the apparatus for the removal of the residual carbon monoxide from the hydrogen stream that is ultimately fed to the fuel cell, are desirable. Improvements to the carbon monoxide removal articles that optimize factors such as high carbon monoxide conversions, carbon monoxide selectivity, simplicity of design and minimization of reactor volumes/weights are especially desirable.

SUMMARY OF THE INVENTION

In one aspect, the invention relates to an article that has a substrate with an inlet end, an outlet end, a length extending between the inlet end to the outlet end, wall elements and a plurality of cells defined by the wall elements. A first layer is deposited on the wall elements from the inlet end and extends at least partially toward the outlet end. The first layer has a preferential carbon monoxide oxidation catalyst. A second layer contains a methanation catalyst, and is deposited on at least part of the first layer from the outlet end. The second layer has a length that is about 10–70% of the substrate length. Preferably the second layer has a length of 30 to 60% of the wall elements' length.

In one embodiment, the substrate is a honeycomb substrate having a plurality of parallel, axially enclosed cells. In another embodiment the substrate is an open-celled foam substrate.

In a preferred embodiment, the preferential carbon monoxide oxidation catalyst includes platinum. More preferably, the preferential oxidation catalyst further includes an iron component.

In another preferred embodiment, the methanation catalyst has a ruthenium component. More preferably, the methanation catalyst includes ruthenium on an alumina support.

A preferred article having a substrate as described above, has a first layer deposited on the substrate from the inlet end and extends at least partially toward the outlet end. In this preferred article, the first layer contains a platinum-based, iron-promoted catalyst. Preferably, there is about 3 to 5 wt. % of platinum and about 0.1 to 0.5 wt. % iron in the platinum-based, iron-promoted catalyst. A second layer is deposited on at least part of the first layer from the outlet end, and has a length that is about 10–70% of the wall elements' length. The second layer contains a ruthenium on alumina catalyst. Preferably, there is about 1 to 10 wt. % of ruthenium in the ruthenium on alumina catalyst.

In another aspect, the invention relates to a process for removing carbon monoxide from an input gas stream that contains carbon monoxide, hydrogen, and oxygen. The process includes contacting the input gas stream with an article as described above. In a preferred embodiment, the preferential oxidation catalyst contains platinum and an iron component. In another preferred embodiment, the methanation catalyst contains ruthenium on an alumina support.

In one embodiment, the process is conducted with an article having a honeycomb substrate containing a plurality of parallel, axially enclosed cells. In another embodiment, the process is conducted with an article that has an open-celled foam substrate. In a preferred embodiment, the input gas contains 10% or more of hydrogen by volume.

In another aspect, the invention relates to a process for removing carbon monoxide from an input gas stream containing carbon monoxide, hydrogen and oxygen using a two-stage process. In the first stage, the input gas stream is contacted with at least one upstream preferential oxidation catalyst article to produce a first outlet gas stream. The first stage is operable to produce a carbon monoxide concentration of less than 1000 ppm. In the second stage, the first outlet gas stream is contacted with a downstream carbon monoxide removal article to produce a second outlet gas stream. The downstream carbon monoxide removal article has a substrate with first and second layer coating architecture as described above.

In yet another aspect, the invention relates to an apparatus for supplying a hydrogen stream to a fuel cell that has a hydrocarbon reformer reactor, a water-gas shift reactor and an article for removing carbon monoxide from the hydrogen stream. The downstream carbon monoxide removal article has a substrate with first and second layer coating architecture as described above. The hydrocarbon reformer reactor is upstream and in train with the water-gas shift reactor, and the article for removing carbon monoxide is downstream and in train with the water-gas shift reactor.

BRIEF DESCRIPTION OF THE DRAWINGS

FIGS. 4 and 5 illustrate exemplary coating architectures in sectional views of a single cell of an article having a honeycomb substrate.

DEFINITIONS

Figure 1:
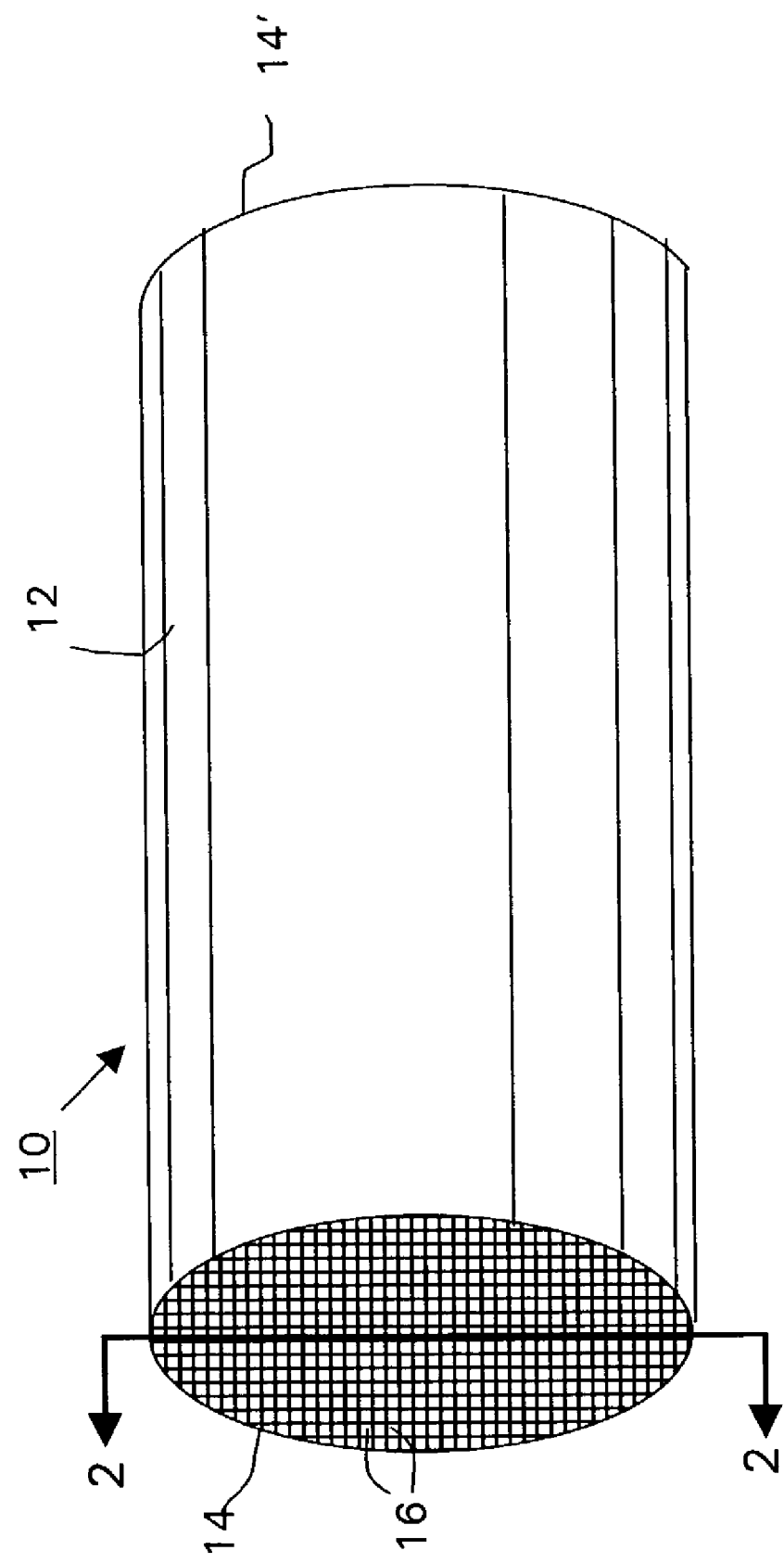
FIG. 1 is a view of in perspective of a honeycomb substrate.

The definitions of certain terms used herein are as follows:

"activated alumina" means a high BET surface area alumina, for example greater than 10 $m^2/g$, preferably greater than 150 $m^2/g$ having primarily one or more of gamma, theta and delta aluminas.

"architecture" is used to mean the physical design of the coating in a zone considering parameters such as the number of layers of coating compositions, the thickness of the layers, and the order of layers where there are more than one layer.

"BET surface area" means the Brunauer, Emmett, Teller method for determining surface area by $N_2$ adsorption. Unless otherwise specifically stated, all references herein to the surface area refer to the BET surface area.

"high surface area support" means support materials with a BET surface area that is approximately greater than 10 $m^2/g$, preferably greater than 150 $m^2/g$.

"incipient wetness impregnation" means the impregnation of the catalyst support with a volume of metal salt solution substantially equal to the pore volume of the support material.

"inlet temperature" shall mean the temperature of test gas, fluid sample or fluid stream being treated immediately prior to initial contact of the test gas, fluid sample or fluid stream with a catalyst composition.

"input gas stream" means a gas stream prior to passing through a catalytic region or prior to initial contact with a catalyst composition.

"iron component" refers to iron or an oxide thereof.

"percent by volume" refers to the amount of a particular gas component of a gas stream, unless otherwise indicated, means the mole percent of the gas component of the gas stream as expressed as a volume percent.

"platinum component" refers to platinum or an oxide thereof.

"ruthenium component" refers to ruthenium or an oxide thereof.

"substrates" refer to structures prepared from refractory materials (e.g., metallic, ceramic) upon which washcoat compositions are deposited. The term shall include substrates of the honeycomb-type, foams and heat exchangers.

"supports" or "catalyst support" refer to particulate materials that are part of the catalyst composition including inorganic oxides including refractory oxide support selected from the group consisting of activated alumina, zirconia, titania, silica, zeolites and combinations thereof.

"VHSV" means volume hourly space velocity; that is, the flow of a reactant gas in liter per hour per liter of catalyst volume at standard temperature and pressure. In embodiments of the invention that include a monolith substrate, the determination includes the volume of the monolith substrate.

"wt. %." or "percent by weight", means weight percent based on the weight of an analyte as a percentage of the total catalyst weight, including the support and any material impregnated therein. The wt. % of the platinum group metal component is calculated on the basis of the weight of the platinum group metal. The calculation does not include the weight of the substrate a washcoat composition deposited-on a monolith substrate.

DETAILED DESCRIPTION OF THE INVENTION

Provided are improved carbon monoxide removal articles and processes for treating hydrogen gas streams to achieve very low threshold levels of carbon monoxide, e.g., below 10 ppm. The articles are compact and do not require extensive provisions for installation into fuel cell processors.

The articles are single substrates coated with at least two distinct catalyst coating compositions (termed "washcoat compositions") to define at least two zones along the axial length of the coated substrate. The zones of the coated substrate are defined by their coating (or lack of coating) and extend for a length of the substrate in which there is the same coating and architecture. One of the washcoat compositions contains a catalyst effective for the preferential oxidation of carbon monoxide; the other washcoat composition contains a catalyst effective for the selective methanation of carbon monoxide. In some embodiments, the substrate on which the washcoats are disposed are carriers of the honeycomb-type; the substrate having a plurality of axially enclosed cells defined by the wall elements that extend from the inlet end of the substrate to the outlet end of the substrate. In other embodiments the substrate is a metallic or ceramic foam having a reticulated structure with a plurality of cells (or pores).

The substrates include an upstream zone (as sensed by inlet hydrogen stream) wherein the cell walls are coated with a washcoat composition that includes a preferential oxidation catalyst. The substrates include a segment further downstream along the axial length of the substrate wherein the cell walls are coated with first layer formed from a washcoat composition containing a preferential oxidation catalyst and a second layer (or overcoat) formed from a washcoat composition that includes a methanation catalyst.

Figure 2:
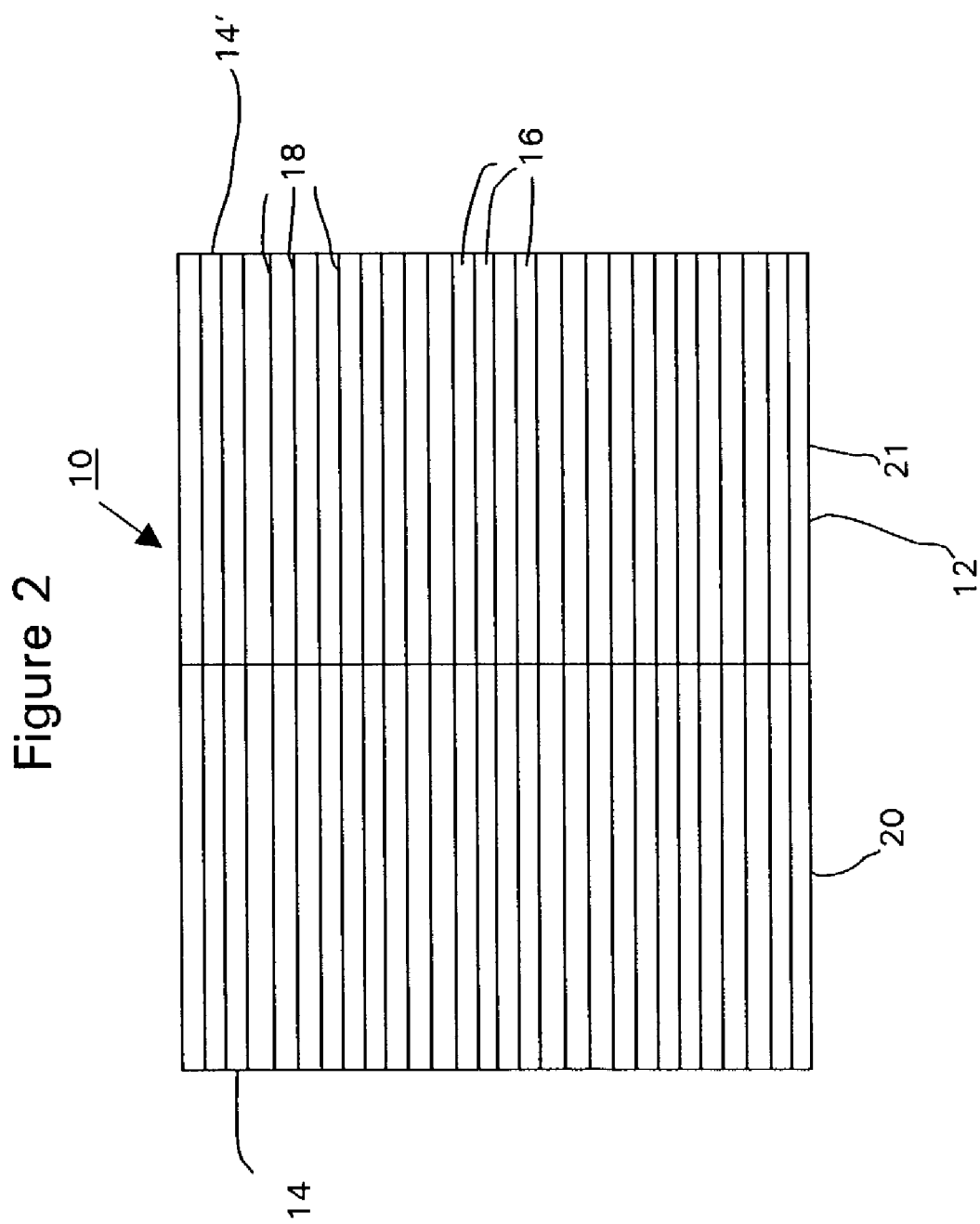
FIG. 2 is a sectional view of the honeycomb substrate of FIG. 1 along Section 2—2.

FIGS. 1 and 2 illustrate a typical substrate of the honeycomb-type used in the articles of the invention. The honeycomb monolith substrates (10) comprise an outer surface (12), an inlet axial end (14) and an outlet axial end (14'). There are a plurality of parallel cells (16) defined by the honeycomb walls (18). Each cell has a corresponding inlet and outlet. The catalyst composition can be coated on the walls using washcoat compositions so that the gases flowing through the passages contact the catalyst material. The honeycomb has different zones (e.g., 20 and 21) along the length of the cells.

Figure 3:
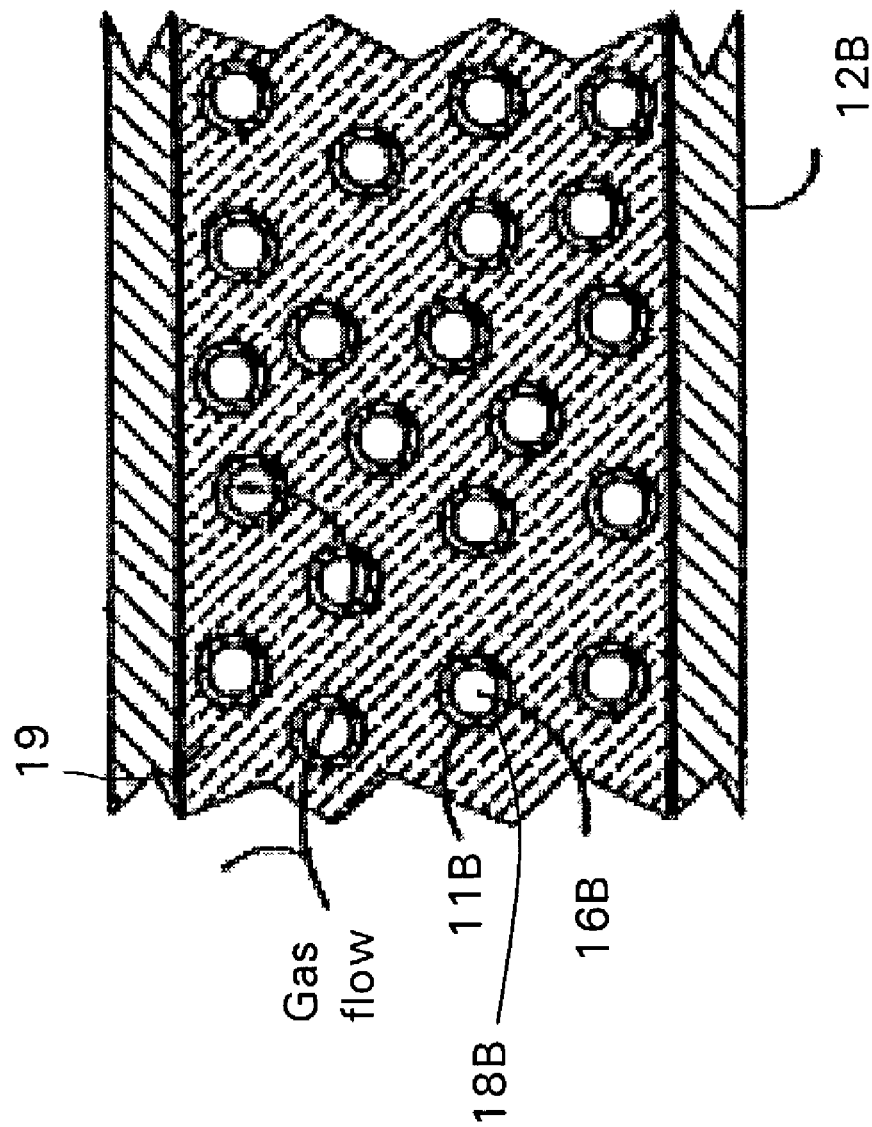
FIG. 3 illustrates a cutaway section of a typical substrate of the foam-type.

In other embodiments, the article is formed on a foam substrate that contains a plurality of pores. FIG. 3 illustrates a cutaway section of a typical substrate of the foam-type. Within housing (12B) the foam (19) is an open-celled foam and the catalyst coating is deposited on the walls (18B) of the cells (16B). The open-celled structure of the foam provides the coated substrate with a high surface area oft the catalyst per volume. A hydrogen stream passing through the substrate from the inlet end to the outlet end of the substrate flows through the plurality of cells defined by the walls of the foam to contact the catalyst layer, (11B) deposited on the walls of the cells.

The preferred coating architectures can be exemplified in the illustration of the sectional views of single cells of honeycomb-type substrates (FIGS. 4 and 5). It can be appreciated by those of skill in the art that analogous coating designs can be applied to foam-type substrates.

FIG. 4 illustrates one preferred coating architecture in a sectional view of a single cell of an article having a honeycomb-type substrate. The zones are defined by their coating (or lack of coating) and extend for a length of the cell in which there is the same coating and architecture. A first layer (11) is disposed on the wall elements (18) from the inlet end (14) to the outlet end (14'). Preferably, the first layer is formed on the wall elements beginning from the inlet end. The first layer is formed from a washcoat composition containing a preferential oxidation catalyst. The second layer (13) is disposed from the outlet end (14', and preferably, beginning from the outlet end), and extends about 10–70% of the wall elements' length. Preferably, the second layer extends 30 to 60% of the wall elements' length. The second layer is formed from a separate washcoat composition that includes a methanation catalyst. The architecture of the catalyst layers in FIG. 4 thereby defines two zones along the axial length of the substrate; an upstream zone (20) having only a single layer on the walls, and a bilayer zone (21) wherein both first and second layers are present. A hydrogen gas stream passing through the article first passes through the upstream zone (20) where it contacts a layer of the preferential oxidation catalyst. It then passes through the bilayer zone (21) where it contacts the bilayer formed from the washcoat containing the preferential oxidation catalyst and the washcoat containing the methanation catalyst.

FIG. 5 illustrates an alternative coating architecture for a honeycomb-type substrate. In this architecture a first layer (11A), again formed from a washcoat composition containing a preferential oxidation catalyst, is disposed on the wall elements (18) from the inlet end (14) to a length that is less than wall elements' length. The length of the first layer is at least 60%, and preferably at least 80% of the wall elements' length. The second layer (13A), formed from a separate washcoat composition containing a methanation catalyst, is disposed from the outlet end (14') and extends about 10–70% of the wall elements' length. The coating architecture thereby defines three zones, an upstream zone (20A), a bilayer zone (21A) and a downstream zone (22A). To ensure adequate interaction of the first and second layers, the second layer preferably overlays the first layer for a length of at least 10%, more preferably at least 30% of the axial length of the substrate. In this embodiment, once a gas stream has passed through the upstream and bilayer zone, it enters a third zone, the downstream zone (22A), where it contacts only the second layer containing the methanation catalyst composition.

Both of the coating architectures illustrated in FIGS. 4 and 5 include a bilayer zone where the second layer overlies and adheres to the first layer. In the bilayer zone, two processes that consume carbon monoxide, oxidation and methanation, can occur simultaneously in a single zone. Allowing the oxidation and methanation of carbon monoxide to occur in a single zone removes the carbon monoxide more effectively than by separate treatments in sequential catalyst zones. While not being bound by theory, it is believed that the oxidation of carbon monoxide that occurs in the first layer provides favorable conditions for the methanation process. The oxidation of carbon monoxide heats the bilayer zone to temperatures where the conditions for the selective methanation (catalyzed by the composition in the second layer) of carbon monoxide are optimized. As the layer containing the methanation catalyst composition (the second layer) is disposed on top of the layer containing the preferential oxidation catalyst (the first layer) in the bilayer zone, the heat generated by the oxidation reaction is efficiently transferred to the second layer.

The coating architectures of FIGS. 4 and 5 also both include an upstream zone where only the preferential oxidation catalyst is disposed on the cell walls of the substrate. A gas stream passing through the article first contacts the upstream zone, where the bulk of the residual carbon monoxide in the hydrogen stream is removed by the oxidation processes catalyzed by the preferential oxidation catalyst. The upstream zone thus serves to lower the carbon monoxide in the hydrogen stream to levels where the remaining carbon monoxide can be removed by a methanation process. In other words, the levels of carbon monoxide are reduced to levels where any methane produced in the subsequent methanation of carbon monoxide are minimal and acceptable from an environmental standpoint.

Preferential oxidation catalysts that are useful to include in the first layer include platinum group metal-based catalysts. Platinum group metal-based preferential oxidation catalysts include platinum-metal based catalysts and palladium metal-based catalysts. The platinum group metal is supported on an inorganic oxide support such as alumina, zirconia, ceria, silica, zeolite materials or combinations thereof. Preferably, there is about 1 to 5 wt. % of the platinum group metal in the catalyst composition. The supported platinum group metals are formed into washcoat compositions and disposed on substrates as described below.

A preferred platinum group metal composition is platinum metal-based catalyst having an iron oxide promoter prepared as disclosed in U.S. patent application Ser. No. 09/392,813, filed Sep. 9, 1999, now U.S. Pat. No. 6,559,094, the disclosure of which is incorporated herein by reference. The catalyst has about 3 to 5 wt. % of platinum and about 0.1 to 0.5 wt. % iron in the composition. This preferred catalyst can oxidize carbon monoxide in a gas stream with excellent selectivity using minimal ratios of $O_2/CO$.

The platinum group metals are preferably dispersed on the inorganic oxide support using an impregnation procedure, wherein an aqueous mixture of a water-soluble or water-dispersible platinum group metal salt or complex, e.g., amine-solubilized platinum hydroxide, is used as a platinum group metal precursor. In embodiments of the invention wherein iron is present in the preferential oxidation catalyst composition, it can be dispersed on the support similarly using an iron salt or complex, e.g., $Fe(NO_3)_2$. Analogous approaches can be taken to incorporate other components into the composition. The impregnated support is then dried and calcined to fix the platinum group metal and optional iron component on to the support. The calcined support can then be formed into washcoat compositions that are applied to substrate as described below. In preferred articles that are coated on honeycomb-type substrate containing a platinum-based, iron-promoted catalyst composition of the type described above, the loading of catalyst composition is typically in the range of about 0.5 to 3 $g/in^3$ with the platinum and optional iron components according to their relative weight percentages as described above.

Methanation catalysts used in the articles of the invention are preferably selective; catalyzing the methanation of carbon monoxide in preference to the methanation of carbon dioxide. Methanation catalysts include catalysts that have platinum group metals that are generally dispersed on an inorganic oxide support such as alumina, zirconia, silica or mixtures thereof. Preferably, the platinum group metals used in the methanation catalysts are selected from ruthenium and rhodium. Useful examples of methanation catalysts include 2 wt. % rhodium on alumina, 5 wt. % ruthenium on alumina and nickel-based catalysts. A preferred methanation catalyst is a ruthenium on alumina composition containing about a 1–10 wt. % ruthenium. The catalyst can be prepared by dispersing the ruthenium on the inorganic oxide support, e.g., alumina, by contacting the support with a water-soluble or water-dispersible salt of ruthenium, e.g., ruthenium nitrate, for sufficient time to impregnate the support. The impregnated support is then dried and calcined, preferably at temperatures below 300° C. The methanation catalyst composition can then be formed into washcoat compositions that are applied to substrates as described below. In preferred articles, having a second layer containing a ruthenium-based methanation catalyst composition, the composition is typically applied to the substrate with a loading of about 0.5 to 3 $g/in^3$ with the ruthenium components according to their relative weight percentages as described above.

The first and second layers are preferably formed from washcoats containing different catalyst compositions. Selection of appropriate combinations of catalysts to use in the first and second layer washcoat compositions is dependent upon a number of factors, including overlap of optimal operating temperature ranges and the compatibility of the catalyst compositions to each other. For instance, a preferred combination of catalysts is a combination having a platinum-based, iron-promoted preferential oxidation catalyst in the composition used to prepare the first layer, and a ruthenium-based methanation catalyst in the composition used to prepare the second layer. It has been found that the temperature increase due to the oxidation catalyzed by the platinum-based catalyst benefits the methanation of carbon monoxide which is optimal and selective at, for example, about 120 to 200° C. when catalyzed by the ruthenium-based catalyst.

Monolithic, honeycomb substrates useful in the zoned articles of the invention are commercially available in various sizes and configurations. The flow passages of the monolithic substrate are thin-walled cells which can be of any suitable cross-sectional shape and size such as trapezoidal, rectangular, square, sinusoidal, hexagonal, oval, circular. Such monolithic substrates may contain up to about 700 or more flow cells ("cells") per square inch of cross section, although far fewer may be used. For example, the substrate can have from about 60 to 600, more usually from about 200 to 400, cells per square inch ("cpsi").

Various types of materials of construction for honeycomb substrates are known. The honeycomb substrate can be made from a variety of materials, including metal or ceramic monoliths. In some embodiments, the honeycomb substrate can be made from a ceramic porous material composed of one or more metal oxides, e.g., alumina, alumina-silica, alumina-silica-titania, mullite, cordierite, zirconia, zirconia-ceria, zirconia-spinel, zirconia-mullite, silicon-carbide, and the like. Some non-limiting examples of ceramic monoliths include those made of zirconium, barium titanate, porcelain, thorium oxide, magnesium oxide, steatite, boron or silicon carbonates, cordierite-alpha alumina, silicon nitride, spodumene, alumina-silica magnesia, zircon silicate, sillimanite, magnesium silicates, zircon, petalite, alpha alumina and aluminosilicates. One example of a commercially available material for use as the substrate for the present invention is cordierite, which is an alumina-magnesia-silica material.

The metallic monolith substrate can be a honeycomb substrate made of a refractory metal such as stainless steel or other suitable iron based corrosion resistant alloys (e.g., iron-chromium alloy). Metal monoliths can be produced, for example, from alloys of chromium, aluminum and cobalt, such as those marketed under the trademark KANTHAL, or those produced from alloys of iron, chromium, aluminum and yttrium, marketed under the trademark of FECRALLOY. The metal can also be carbon steel or simple cast iron. Monolith substrates are typically fabricated from such materials by placing a flat and a corrugated metal sheet one over the other and rolling the stacked sheets into a tubular configuration about an axis parallel to the configurations, to provide a cylindrical-shaped body having a plurality of fine, parallel gas flow passages, which can range, typically, from about 200 to about 1,200 per square inch of face area. Heat exchangers, which are typically formed from metallic materials, can also be used as the monolith structures.

In other embodiments, the substrate can be made of a ceramic or metal foam. Examples of ceramic foams are disclosed in U.S. Pat. No. 6,077,600, which is herein incorporated by reference. The ceramic foam carriers have walls formed from fibers coated with ceramic materials. Substrates in the form of metal foams are well known in the prior art, e.g., see U.S. Pat. No. 3,111,396, which is herein incorporated by reference.

Washcoat compositions (or "slurries") of the catalyst for deposition on substrates are prepared using methods known in the art. Preferably, the impregnated oxide support is ball milled as a suspension using sufficient water to prepare a slurry of a desired concentration. The concentration of the solids in the washcoat slurry can be used as a method to control the thickness of the catalyst coating ultimately deposited on the substrate. For example, increasing the weight percentage of solids in the aqueous slurry will result in a thicker catalytic coat.

It is also generally advantageous to prepare slurries having particles of small particle sizes, e.g., less than 10 μm, to maximize the surface area of the catalyst upon deposition on the substrate. Therefore, the particle size distribution of the slurry is typically measured, and milling is continued until the desired particle size has been achieved. Binders such as hydrated forms of alumina, e.g., pseudoboehmite, are optionally included in the slurries to improve adherence of the washcoat to the substrate walls.

To form the first layer, the calcined support containing the preferential oxidation catalyst composition can be combined with water and further comminuted if desired to form a washcoat composition. The washcoat slurries are deposited on the substrates by methods well-known to those of ordinary skill. Thus, for example, in a typical honeycomb substrate preparation, a layer of the supported preferential oxidation catalyst can be prepared by dipping the substrate in a reservoir containing a sufficient volume of the slurry so that the substrate is coated to a desired length of the substrate. The coated substrate can be subsequently dried and calcined. To form the second layer, after coating of the first layer, only the downstream longitudinal segment of the desired length of the substrate would be dipped into a slurry containing the methanation catalyst, and the entire substrate is dried and calcined. The calcined substrate is then activated with a reducing gas stream, such as the process gas itself.

In embodiments of the invention wherein the monolith substrate is formed from metallic honeycomb substrates, the zones can be also formed by depositing (e.g., sputtering) the washcoat slurries on a downstream segment of the sheets before they are rolled up to form cylindrical monolith structures. It will be apparent to those of skill in the art that it is possible, using conventional washcoating techniques for metallic substrates, to leave short longitudinal segments of the substrate uncoated. For example, a short uncoated zone at either end of the metallic substrate is possible. Such techniques are less desirable from the standpoint of minimizing substrate volume, but are within the scope of the invention.

The invention also relates to processes for using the articles for the removal of carbon monoxide from a hydrogen gas stream. For example, the articles of the invention can be incorporated in reactors that are charged with an input gas stream containing hydrogen and carbon monoxide to produce an output hydrogen stream that contains substantially lower levels of carbon monoxide. Levels that meet specifications for an input hydrogen feed stream for a fuel cell, for example, can be achieved using the carbon monoxide removing processes of the invention.

The composition of the input hydrogen gas stream for the process can vary depending on the source of the hydrogen gas stream. For instance in fuel cell applications, the input gas stream for the process typically include carbon dioxide, steam, and nitrogen in addition to hydrogen and carbon monoxide. Minor amounts of hydrocarbon can also be present.

In fuel cell applications of the inventive process, the input gas streams typically contain at least 10% by volume of hydrogen, and more typically from about 40 to 70% of hydrogen on a dry basis in addition to the carbon monoxide. The input gas stream also generally contains from about 10 to 25% by volume of carbon dioxide. In addition, there is typically from about 10 to 30% by volume of added steam (i.e., gaseous $H_2O$) in the input hydrogen gas streams in fuel processors. These levels of hydrogen, carbon dioxide and steam in the input gas stream can be accommodated by the processes of the invention.

The operating temperatures of the carbon monoxide removing processes of the invention can be adjusted to optimize the reaction rate, carbon monoxide conversion and selectivities for carbon monoxide oxidation or methanation. For example, wherein the article is prepared with a platinum-based, iron-promoted preferential oxidation catalyst composition in the first layer, and a ruthenium-based methanation catalyst composition in the second layer, the processes can be carried out from about 80 to 180° C., preferably from 100 to 160° C. and more preferably from 100 to 140° C.

Preferably, the carbon monoxide removing processes are carried out in a continuous mode with the reactants being passed through the coated substrate. Gaseous hourly space velocities of about 1,000 to about 100,000 $hr^{-1}$ VHSV measured on the basis of dry gas under standard conditions are particularly suitable for most fuel cell operations. Preferred operating ranges are from 2,500 to 50,000 $hr^{-1}$.

The processes of the invention can accommodate a range of carbon monoxide concentrations in the input hydrogen stream, depending on the output carbon monoxide concentration requirements of a particular application. In fuel cell processors the concentration of carbon monoxide in the reformate gas stream that serves as the input stream to the preferential oxidation reactors is generally from about 0.05 to 2% by volume.

The molar ratio of oxygen to carbon monoxide in the input gas stream ($O_2$/CO ratio) to the process can be adjusted to optimize carbon monoxide conversion and the selectivity of the oxidation reaction. This ratio can be adjusted according to the particular requirements of the application using, for example, a single inlet for injection air (or oxygen). In fuel cell applications, the $O_2$/CO ratio is preferably from about 0.25 to 5, preferably from 0.5 to 3, and more preferably 1–2.5.

An advantage obtained using the zoned articles over a two stage preferential oxidation system is that provisions for only a single injection of oxygen/air are needed. Besides the increase in operational simplicity, use of single injection of air minimizes the dilution of the resulting hydrogen stream with nitrogen.

Higher levels of carbon monoxide in the input hydrogen gas stream can be accommodated by variation of certain process parameters. Although less desirable from the standpoint of hydrogen fuel conservation, a higher carbon monoxide conversion can be achieved at the expense of consuming hydrogen, for example, by increasing the $O_2$/CO ratio.

In one preferred embodiment, the zoned catalyst articles of the invention are incorporated as polishing beds (also known as "finishing beds") in fuel cell processors, where the bulk of the carbon monoxide is removed from the hydrogen stream in one or more upstream oxidation catalyst stages. The one or more upstream oxidation catalyst beds can incorporate different catalyst compositions, e.g., platinum-based catalysts or base metal-based catalysts (e.g., copper-based catalysts), that convert the bulk of the carbon monoxide in the gas stream. Preferably, the one upstream preferential catalyst bed produces a hydrogen stream containing carbon monoxide in a concentration of less than 1000 ppm before contact with the zoned catalyst articles of the invention. Selection of the upstream catalyst beds can also be based on a number of other considerations including selectivity and cost.

Although the zoned catalyst articles of the invention can be used in any application where it is desired to remove carbon monoxide from a hydrogen-containing gas stream, a particularly useful application is in apparatus such as fuel processors that supply hydrogen to fuel cells. These processors typically comprise a series of reactors that convert hydrocarbon fuels (e.g., natural gas, gasoline, fuel oil, liquid petroleum gas, and the like) into hydrogen fuel. The conversions that take place in the reactors typically include reforming reactions and water-gas shift reactions to produce hydrogen. Other reactors and trapping devices can also be included in the apparatus that reduce unwanted components in the hydrogen feed streams (e.g., sulfur components), that are ultimately supplied to the fuel cell. Reactors for removing carbon monoxide (e.g., preferential oxidation reactors and selective methanation reactors), are typically incorporated to provide a finishing step to polish the hydrogen feed stream of residual carbon monoxide.

Figure 6:
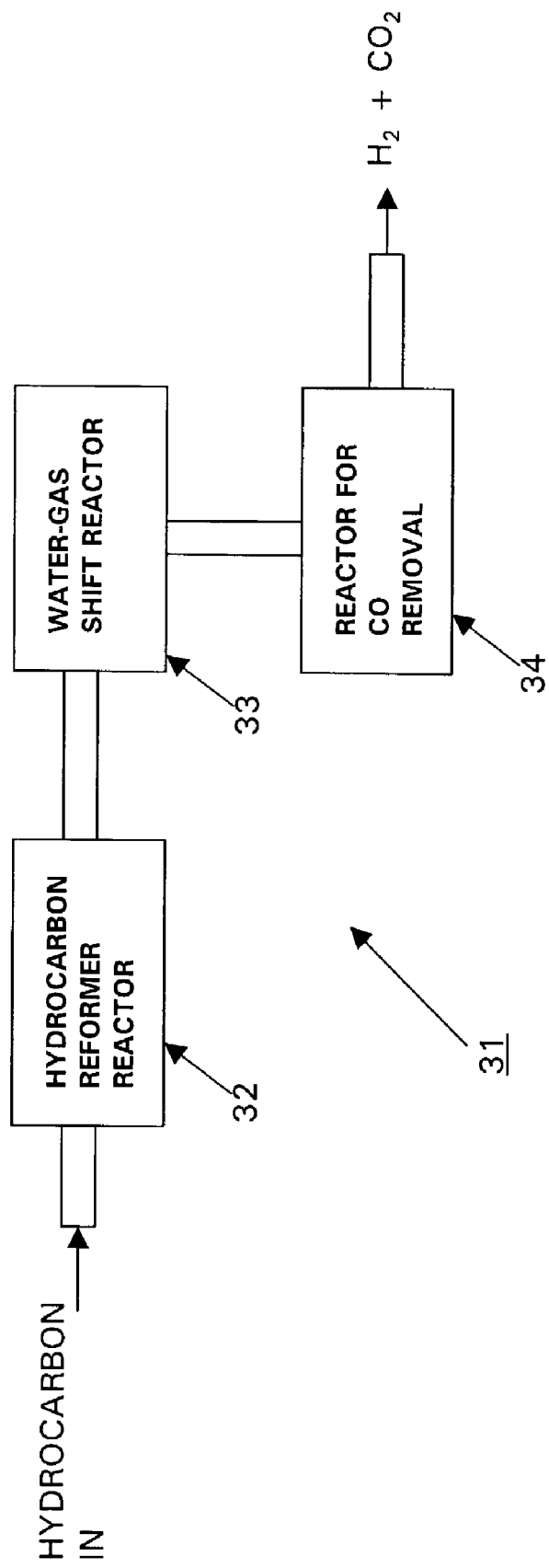
FIG. 6 is a schematic illustrating one embodiment of a typical fuel cell processor.

As seen in a typical fuel processor (31) depicted in FIG. 6, the hydrocarbon reformer reactor (32) converts hydrocarbons (e.g., methane) and steam into hydrogen, carbon monoxide, and carbon dioxide as described above. The resulting gas is then reacted in the water-gas shift reactor (33) to further enrich the process gas in hydrogen, through the reaction of carbon monoxide with steam. Residual carbon monoxide in the process stream is then removed by selective oxidation and methanation of carbon monoxide in the reactor for removal of carbon monoxide (34). The resulting process stream, comprising high levels of hydrogen, is then supplied to the fuel cell.

The following examples further illustrate the present invention. but of course, should not be construed as in any way limiting its scope. The concentration of specific components of gas compositions, other than steam, are expressed either as volume percentages or as parts per million (ppm) on a dry basis. The concentration of steam is indicated as a percentage of added steam. The monolith substrates used in the examples were cylindrical in shape having diameters of ¾ in and lengths of either 1½ in or 3 in. The flow rates of the test gases were adjusted to achieve the specified space velocities. The concentration of carbon monoxide in the output gas was detected in the examples using an infrared gas analyzer (Siemens Applied Automation) and the $O_2$ was detected using an electrochemical analyzer (Advanced Instruments). The methane concentration in the output gas was determined using a flame ionization detector (Rosemount 440A hydrocarbon analyzer).

EXAMPLE 1

Preparation of 5 wt. % Ruthenium on Alumina Washcoat

An aqueous ruthenium nitrosyl nitrate solution (52.8 g) was diluted with deionized water to provide a 73 mL volume of solution. This solution was used to impregnate 100 g of gamma alumina powder using an incipient wetness impregnation technique. After mixing well, the powder was dried at 120° C. for two hours, and then calcined at 250° C. for two hours. The powder was slurried with water to form the washcoat.

EXAMPLE 2

Preparation of a Zoned Catalyst Article, Article A (Prox Catalyst Zone/ Dual Catalyst Zone)

A commercially available, monolithic catalyst coated along the entire axial length with a washcoat having approximately 5 wt. % platinum and about 0.3 wt. % iron on an alumina support (Selectra™ PROX catalyst (Engelhard Corp. Iselin N.J.) was used as the starting workpiece. The ceramic monolith substrate contained 400 cells per square inch (cpsi). The monolith substrate was dipped into the 5% Ru/alumina washcoat of Example 1 to a depth of 50% of the substrate's axial length to form the second (top) layer. The washcoat loading of the second layer was 2 g/in$^3$ based on the coated volume (i.e., the axial segment of the monolith substrate that was coated with the ruthenium-containing washcoat). The excess slurry was removed by blowing air through the channels of the monolith. The catalyst was then dried at 120° C., and calcined at 250° C. in air.

The ruthenium layer in the article was activated after the calcination procedure by exposure to the process stream at approximately 200° C. The extent of activation was monitored by determining the quantity of methane produced by subsequent treatment with a process stream using a downstream hydrocarbon analyzer.

This catalyst article is designated as "Article A."

EXAMPLE 3

Preparation of a Reference Bilayer Catalyst Article, Article B, Having a First Layer Containing a Prox Catalyst and Second Layer Containing a Methanation Catalyst A monolith catalyst article was prepared identically to Article A of Example 2, except that the ruthenium-containing washcoat was coated overlaying the first layer over the entire axial length of the monolith substrate. The washcoat loading of the second layer was 1 g/in$^3$ based on the coated volume. This catalyst article is designated as "Article B".

It is noted that Article B and Article A of Example 2 contained the same loading of ruthenium washcoat based on the entire volume of the substrate. In addition, the total platinum group loading for both Articles A and B was the same.

EXAMPLE 4

Comparative CO-Abatement Performance of the Zoned Catalyst Article (Article A) vs. Two Reference Catalyst Articles In this example, the carbon monoxide abatement of Article A is compared with two different reference catalyst articles, Articles C and D as described below.

(1) A single stage (single monolith substrate) preferential oxidation catalyst article containing a 400 cpsi substrate having approximately 5 wt. % platinum and about 0.3 wt. % iron on an alumina support (Selectra™ PROX catalyst, Engelhard Corp. Iselin N.J.). This article is designated as "Article C."

(2) A two stage (two substrate) system having a first substrate coated with a preferential oxidation catalyst and a second, separate substrate coated with a methanation catalyst. Each of the substrates contained 400 cpsi. The preferential oxidation catalyst article had single layer containing approximately 5 wt. % platinum and about 0.3 wt. % iron on an alumina support. The methanation catalyst comprised a single layer formed from the ruthenium-containing washcoat of Example 1 with a washcoat loading of 1 g/in$^3$ per substrate volume. This article is designated as "Article D"

The substrate articles were placed in a quartz tube reactor (1 inch diameter) and exposed to a test gas. The test gas had a dry gas composition of 0.3% CO, 15% $CO_2$, 50% $H_2$, and the balance was $N_2$. 25% Steam was added as a diluent. Air was added as a source of oxygen to achieve an $O_2$/CO ratio of either 1.4 or 1.75. The flow rate of the test gas was adjusted so that the space velocity through the article was 30 k/hr. The temperature of the test gas (inlet temperature) was varied between 100 and 120° C. to determine the outlet CO concentration (expressed as ppm) for each system. The results of the experiment are graphically displayed in FIG. 7.

Figure 7:
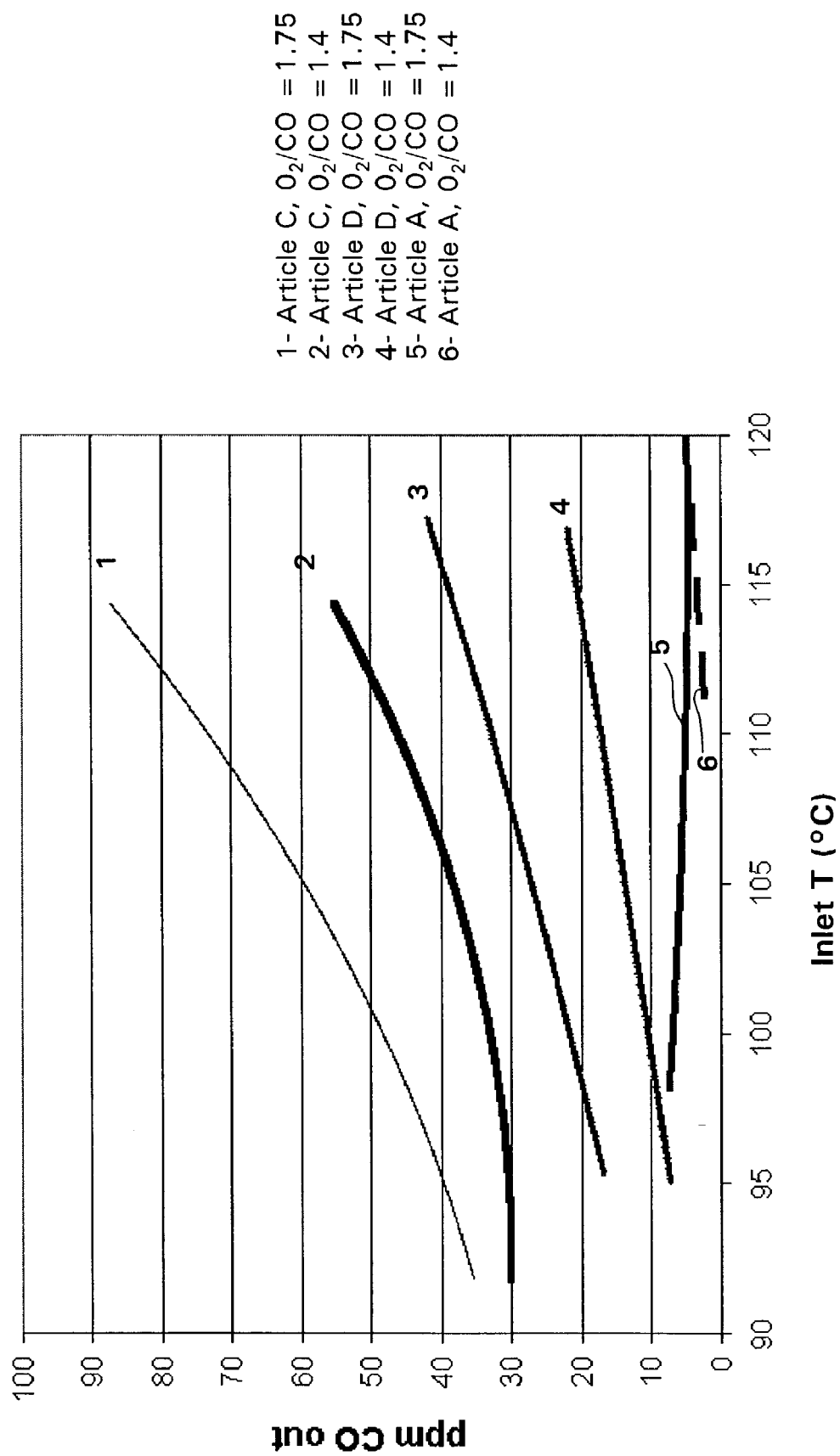
FIG. 7 is a graph showing the comparative outlet carbon monoxide concentrations over an inlet temperature range for three different catalyst articles.

The data displayed in FIG. 7 clearly shows the improved CO abatement performance achieved using the zoned catalyst article of the invention relative to the performance of the reference articles. First, the CO -abatement performance of both of the reference articles, Articles C and D, show significant sensitivity to the inlet temperature and the $O_2$/CO ratio. For example, as the inlet temperature rises, the outlet CO concentration increases for both Article C (containing only a platinum-base Prox catalyst) and for Article D (having the Prox and methanation catalysts disposed on separate and sequential substrates). While not being bound by theory, the increase in the observed outlet CO concentration with rising temperature is believed to be a consequence of the reverse water-gas shift activity of the catalyst.

Similarly, as the $O_2$/CO ratio is increased from 1.4 to 1.75, each of the corresponding curves for reference Articles C and D reflect a shift to higher observed outlet CO concentrations for the same inlet temperatures. It is believed that the increased proportion of $O_2$ oxidizes additional hydrogen. The additional heat generated by this oxidation results in an adiabatic temperature rise, which contributes to favorable conditions for the reverse-water-gas shift reaction. The reverse water-gas shift reaction results in the higher CO concentration observed in the outlet stream.

When the CO outlet concentration was determined in trials run with a zoned catalyst article, Article A, the CO vs. temperature curve is approximately flat, reflecting an insensitivity within the tested temperature range. In addition, in contrast to the CO abatement performance of reference Articles C and D, an increase in the $O_2$/CO ratio from 1.4 to 1.75 did not cause an increase in the observed outlet CO concentration for Article A. It is also noted that much lower CO outlet concentration was achieved throughout the temperature range tested, in trials conducted with Article A than in the trials conducted with reference Articles C and D.

While not being bound by theory it is believed that in the trials for Article A, the effect of reverse water-gas shift activity is offset by the methanation achieved. Any CO generated by the reverse water-gas shift reaction, can be consumed by treatment in the second layer containing the methanation catalyst. It is believed that the methanation is more effective in the zone-coated experiment because of more efficient transfer of heat from the undercoat (i.e., first layer) to the overcoat (i.e., second layer) than any heat transfer mechanisms that would occur in configurations having a downstream methanation catalyst coated on a discrete downstream substrate (i.e., reference Article D).

Efficient removal of CO with the zoned catalyst article, Article A, was achieved with minimal cost in terms of the quantity of methane produced or hydrogen consumed. For example, the concentration of methane produced was $\leq 200$ ppm at <120° C. This concentration reflects only about a ~10% increase in the amount of hydrogen consumed, relative to that consumed with excess oxygen.

EXAMPLE 5

Comparative Performance of Article A and Article B

In this example, the superior CO-removal efficiency associated with a zoned catalyst article, Article A, is demonstrated by comparison with the CO-removal efficiency observed for a reference bilayer catalyst article having a single zone having dual preferential oxidation and methanation activity, i.e., Catalyst B (prepared in Example 3).

Figure 8:
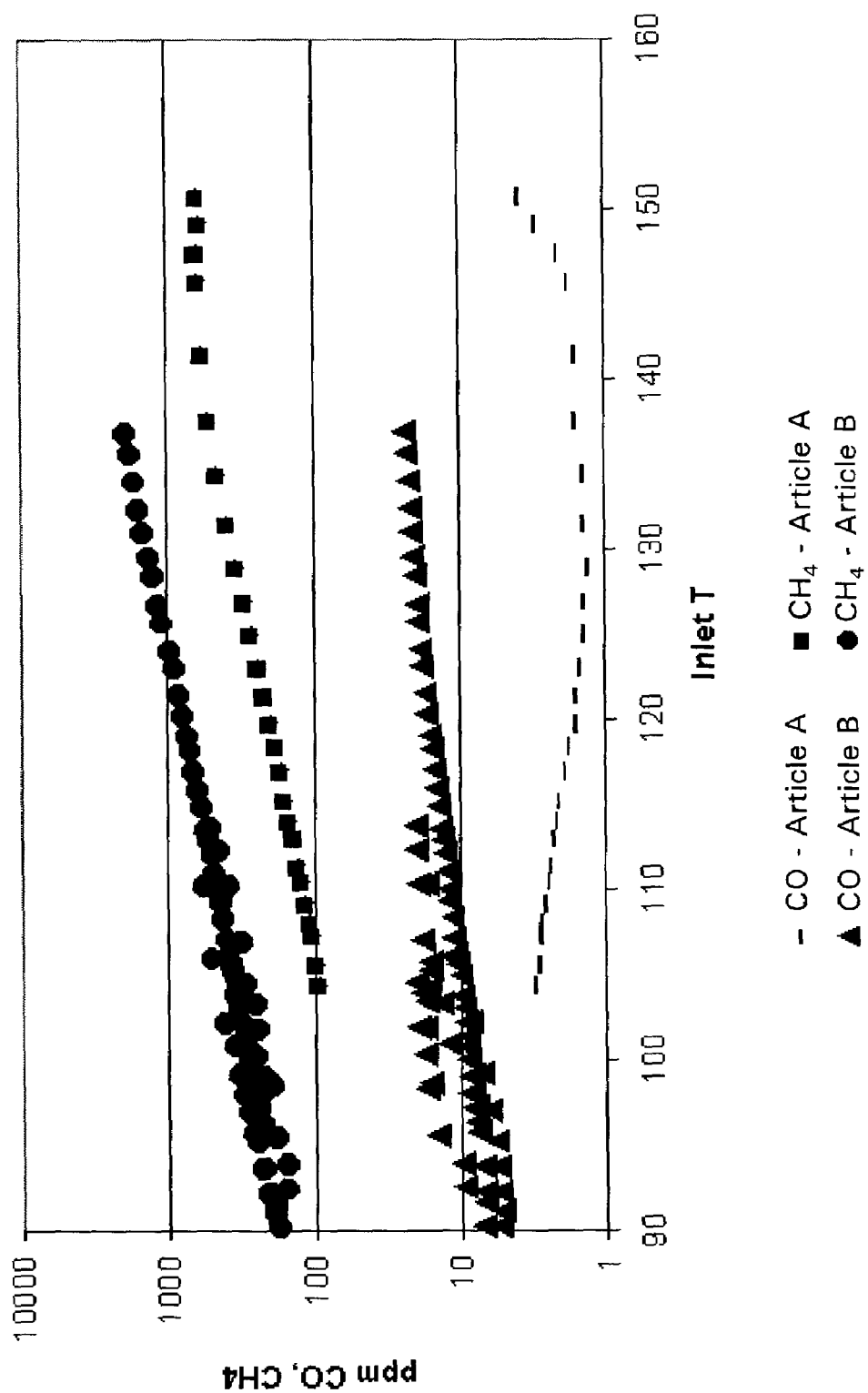
FIG. 8 is a graph showing comparative outlet carbon monoxide and methane concentrations for two different catalyst articles.

The substrate articles were placed in a quartz tube reactor (1 inch diameter) and exposed to a test gas. The test gas had a dry gas composition of 0.3% CO, 15% $CO_2$, 50% $H_2$ and the balance was $N_2$. 25% Steam was added as a diluent. Air was added as a source of oxygen to achieve an $O_2$/CO ratio of 1.7. The flow rate of the test gas was adjusted so that the space velocity through the article was 10 k/hr. The temperature of the test gas (inlet temperature) was varied between either 90–140° C. or 105–150° C. and the outlet CO and methane concentrations (expressed as ppm) were determined for each system. The results of the experiment are graphically displayed in FIG. 8.

Higher levels of CO were observed for the same temperatures for the reference Article B, which is a single zone bilayer catalyst, than for Article A, which has an upstream Prox zone and a downstream dual Prox/methanation zone, i.e., Article A. The discrepancy in the observed outlet CO levels associated with the articles is particularly significant in light of their identical ruthenium metal loading as well as platinum group metal loading. The coating architecture accounts for the improved performance.

Higher levels of methane were also observed for the same temperatures for Article B than for the zoned catalyst article, Article A. The amount of CO produced in trials with reference Article B increased from 200 to 600 ppm over the 90–115° C. inlet temperature range. Over the same temperature range the amount of methane produced using Article A, increased from 100–200 ppm. Thus, even as Article A more effectively lowers the level of CO in the outlet gas stream, the cost incurred in terms of the amount of methane produced is less than the amount associated with use of Article B.

Thus, treatment of hydrogen streams using the zoned catalyst article of the invention more effectively abates CO levels in the outlet hydrogen stream than does treatment with a single zone bilayer article, and achieves the abatement while producing significantly less methane.

EXAMPLE 6

Performance Evaluation of a Zoned Catalyst Article (Article A) as a Polishing Stage in a Two Stage CO-Abatement System In this example, the performance characteristics of a zoned catalyst article (Article A, prepared according to Example 2) as a second stage (polishing stage) incorporated into a two-stage system for treatment of a hydrogen stream containing 0.75% CO (as a percentage of the dry gas composition), are described. The first stage of the system contained a preferential oxidation catalyst article composed of a single layer containing approximately 5 wt. % Pt and about 0.3 wt. % iron on an alumina support that was coated on 400 cpsi cordierite substrate. Article A was used in the second stage. Each of the stages were placed in separate reactors that were fluidly connected. The two stage-system was exposed to a test gas having a dry gas composition of 0.75% CO, 15% $CO_2$, 50% $H_2$ and the balance was $N_2$. 30% Steam was added as a diluent. Air was added as a source of oxygen, and the volume of air was split between the two carbon monoxide treatment stages so that 85% percent of the air was injected in the first stage (Prox stage) and 15% of the total was injected into the second stage (containing Article A).

Two trials were conducted with the two-stage CO removal system with one trial run at higher space velocity, i.e., $\geq 35$ k/hr, and another trial at lower space velocity, i.e., $\leq 20$ k/hr. The flow rate of the test gas was adjusted to achieve the desired space velocities through each stage of the system. The inlet temperature of the test gas was varied, while the outlet CO and methane concentrations were monitored. The performance results of the higher space velocity trial are graphically depicted in FIG. 9, while the results of the lower space velocity trial are graphically depicted in FIG. 10. Table 1 and Table 2 summarize the operating parameters and performance results at an inlet temperature of 140° C.

TABLE 1

| Parameter Function | Inlet Condition | First Stage Prox | Second Stage Zoned Prox/ Methanation |
|---|---|---|---|
| space velocity | | 42 k/hr | 35 k/hr |
| inlet temperature | | 140 | 140 |
| inlet [CO] % (dry basis) | 0.75 | | |
| inlet [$O_2$], % | | 0.68 | 0.1 |
| outlet [CO], ppm | | 700 | 7 |
| CO conversion, % of total | | 91 | 99.9 |
| outlet [$CH_4$], ppm | | | <200 |
| steam, % | 30 | | |
| [$H_2$], % (dry basis) | 50 | | |
| [$CO_2$], % (dry basis) | 15 | | |

TABLE 2

| Parameter Function | Inlet Condition | First Stage Prox | Second Stage Zoned Prox/ Methanation |
|---|---|---|---|
| space velocity | | 20 k/hr | 12 k/hr |
| inlet temperature | | 140 | 140 |
| inlet [CO] % (dry basis) | 0.75 | | |
| inlet [$O_2$], % | | 0.66 | 0.1 |
| outlet [CO], ppm | | 470 | 6 |
| CO conversion, % of total | | 94 | 99.9 |
| outlet [$CH_4$], ppm | | | 350 |
| steam, % | 30 | | |
| [$H_2$], % (dry basis) | 50 | | |
| [$CO_2$], % (dry basis) | 15 | | |

Figure 9:
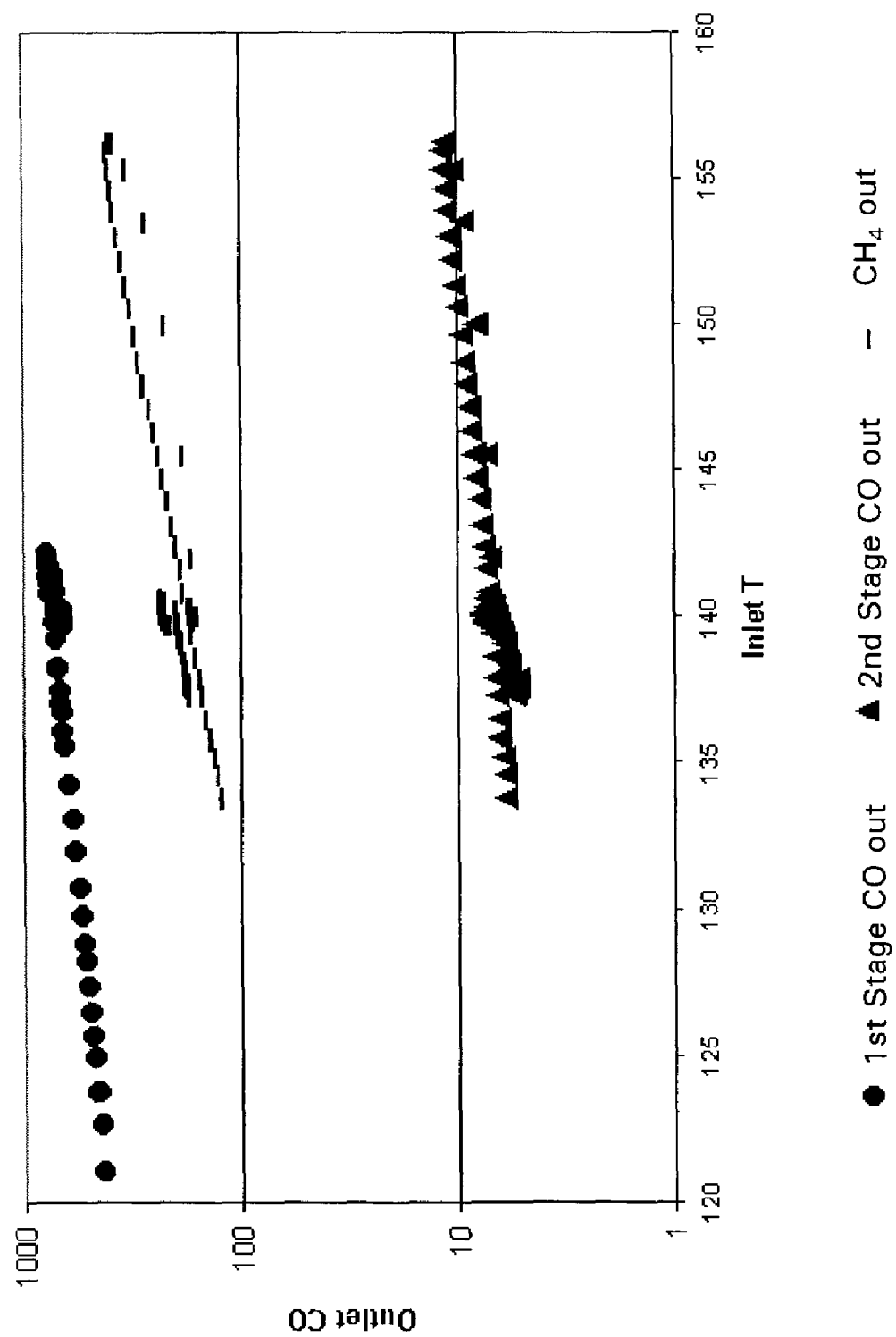
FIGS. 9 and 10 graphically display outlet carbon monoxide and methane concentrations for treatment of a hydrogen stream at two different space velocities with a system containing a first stage preferential oxidation catalyst and a second stage zoned catalyst article.
Figure 10:
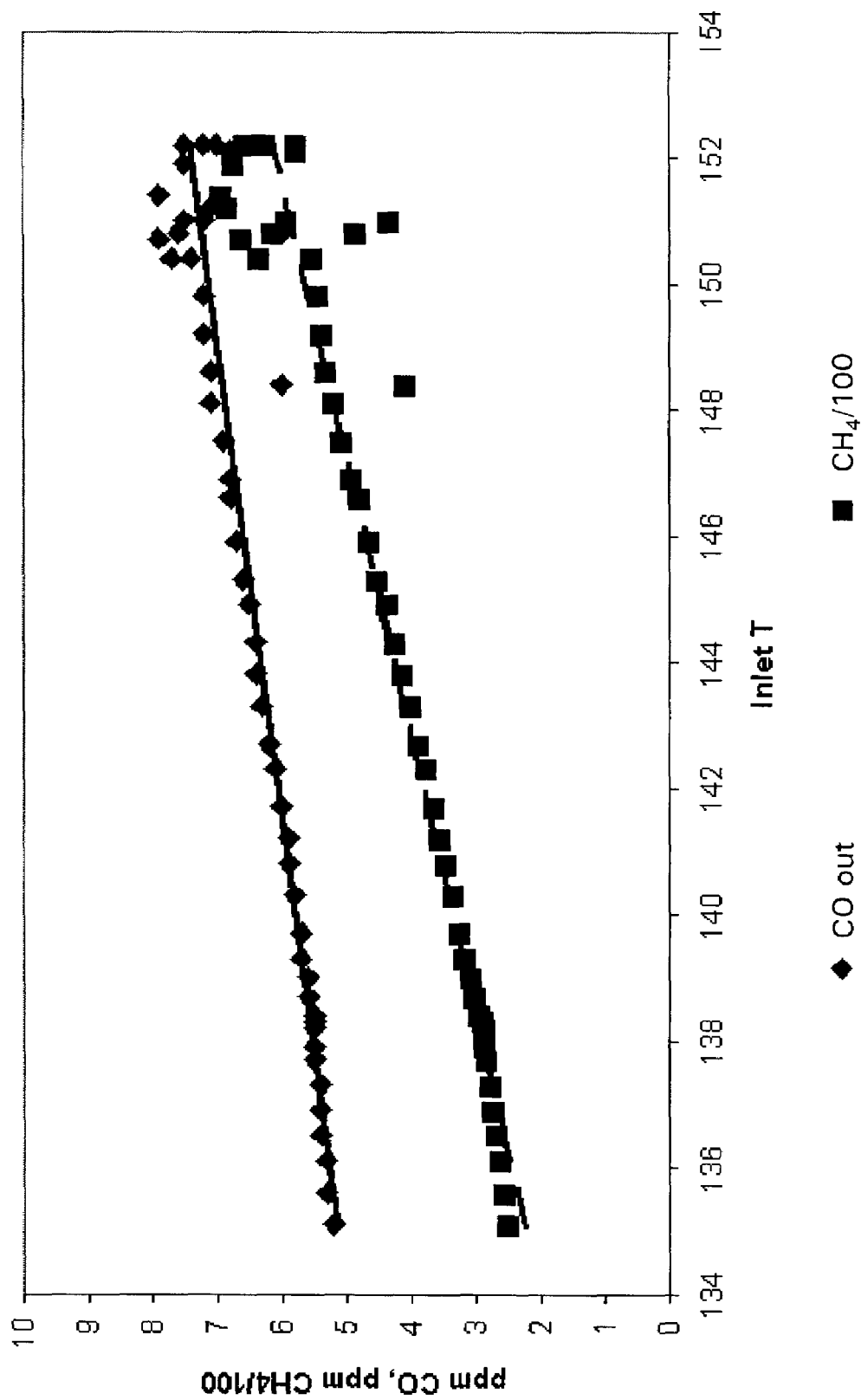

As the data in FIG. 9 shows, at higher space velocities, i.e., ≧35 k/hr, maintenance of outlet CO threshold below 10 ppm is achieved at temperatures at or below 140° C. This threshold is achieved with less than 200 ppm of methane produced in the outlet gas stream. At lower space velocities, i.e., ≦20 k/hr, as seen in FIG. 10, the outlet CO concentration remained below 10 ppm throughout the entire temperature range tested. At these lower space velocities the observed methane in the outlet gas stream was slightly higher, for example ~500 ppm at an inlet temperature of 140° C., than for the trial run at higher space velocity.

The achievement of the 10 ppm threshold at the lower space velocities is particularly significant. Such conditions normally favor the reverse water-gas shift reaction using articles containing platinum-based catalysts. As mentioned above, this side reaction has the undesirable effect of increasing the outlet CO concentration. The presence of the second layer provides a mechanism through which any CO generated by the reverse water-gas shift reaction, is consumed through the methanation reaction.

What is claimed is:

1. An apparatus for supplying a hydrogen stream to a fuel cell, said apparatus comprising a hydrocarbon reformer reactor, a water-gas shift reactor, and an article for removing carbon monoxide in the hydrogen stream, wherein the article comprises:
   a substrate comprising an inlet end, an outlet end, a length extending between the inlet end to the outlet end, wall elements and a plurality of cells defined by the wall elements;
   a first layer deposited on the wall elements from the inlet end and extending at least partially toward the outlet end, wherein the first layer comprises a preferential carbon monoxide oxidation catalyst; and
   a second layer deposited on at least part of the first layer from the outlet end and having a length that is about 10–70% of the wall elements' length, the second layer overlaying the first layer for a length of at least about 10% of the wall elements' length, wherein the second layer comprises a methanation catalyst;
   wherein the hydrocarbon reformer reactor is upstream and in train with the water-gas shift reactor, and the article for removing the carbon monoxide is downstream and in train with the water-gas shift reactor.

2. The apparatus of claim 1, wherein the substrate is a honeycomb substrate having a plurality of parallel, axially enclosed cells.

3. The apparatus of claim 1, wherein the substrate is an open-celled foam substrate.

4. The apparatus of claim 1, wherein the second layer has a length of about 30% to about 60% of the wall elements' length.

5. The apparatus of claim 1, wherein the preferential carbon monoxide oxidation catalyst comprises platinum.

6. The apparatus of claim 5, wherein the preferential carbon monoxide oxidation catalyst further comprises an iron component.

7. The apparatus of claim 1, wherein the methanation catalyst comprises ruthenium on an alumina support.

8. The apparatus of claim 1, wherein the preferential carbon monoxide oxidation catalyst comprises about 3 to 5 wt. % of platinum and about 0.1 to 0.5 wt. % iron in the platinum-based, iron-promoted catalyst.

9. The apparatus of claim 1, wherein the methanation catalyst comprises about 1 to 10 wt. % of ruthenium.

10. The apparatus of claim 1, wherein the second layer overlays the first layer for a length of at least about 30% of the wall elements' length.

11. The apparatus of claim 1, wherein the preferential carbon monoxide oxidation catalyst comprises a platinum group metal.

12. The apparatus of claim 1, wherein the preferential carbon monoxide oxidation catalyst comprises about 5 wt. % of platinum.

* * * * *